United States Patent [19]

Hinton et al.

[11] Patent Number: 4,699,497

[45] Date of Patent: Oct. 13, 1987

[54] ILLUMINATION LAMP ASSEMBLY FOR A DOCUMENT SCAN SYSTEM

[75] Inventors: John H. Hinton, Ontario; Keith A. Nau, Webster; Roger W. Budnik, Rochester, all of N.Y.

[73] Assignee: Xerox Corporation, Stamford, Conn.

[21] Appl. No.: 865,324

[22] Filed: May 21, 1986

[51] Int. Cl.$^4$ ............................................. G03G 15/00
[52] U.S. Cl. .................................. 355/14 E; 355/3 R; 313/113
[58] Field of Search .................. 355/3 R, 14 R, 14 E; 313/110, 111, 114, 113; 362/327, 3

[56] References Cited

U.S. PATENT DOCUMENTS

| | | | |
|---|---|---|---|
| 1,822,980 | 9/1931 | Palmer | 211/26 X |
| 2,183,647 | 12/1939 | Holden | 240/6 |
| 3,788,560 | 1/1974 | Hough et al. | 240/51.11 R |
| 3,998,539 | 12/1976 | Kidd | 355/4 |
| 4,226,527 | 10/1980 | Lama et al. | 355/71 |
| 4,357,649 | 11/1982 | LaCroix | 362/217 |
| 4,634,261 | 1/1987 | Nagoshi | 355/14 E X |
| 4,636,063 | 1/1987 | Takai et al. | 355/14 E X |

FOREIGN PATENT DOCUMENTS

| | | | |
|---|---|---|---|
| 2410037 | 9/1944 | Fed. Rep. of Germany | 240/211 |
| 400982 | 11/1933 | United Kingdom | 240/103 |
| 720999 | 12/1954 | United Kingdom | 75/2 |
| 837819 | 6/1960 | United Kingdom | 38/1 |

*Primary Examiner*—A. C. Prescott

[57] ABSTRACT

An illumination lamp assembly is provided for scan/illuminating a document during a document scan mode. The assembly includes an elongated lamp partially enclosed by a pair of elliptical reflectors. The lamp ends are centered at the focal point of the two reflectors and the lamp is releaseably secured between fixed end blocks and a retaining bias means arrangement which centers lamp at the reflector focal point and permits adjustment-free removal and replacement. Vibrational strobing of the lamp is decreased by providing at least one elastomeric O-ring around the lamp circumference to increase the lamp stiffness and raise the natural frequency of the lamp into a range where the resonant effects of the strobing are reduced.

4 Claims, 4 Drawing Figures

ILLUMINATION LAMP ASSEMBLY FOR A DOCUMENT SCAN SYSTEM

This invention relates to an electrophotographic reproduction system and, in particular to a scanning illumination system including a linear illumination lamp with associated reflector which is moved parallel to a platen to scan/illuminate a document to be reproduced.

In a document reproduction system which incorporates a scanning optical system (moving illumination source, reflectors, mirrors, projection lens) to project an image of a document onto a photoreceptor surface, the exposure of a point on the photoreceptor is equal to the total incidence received by the point as it scans through an irradiance slit. When a uniform density document is being imaged, a uniform exposure of the photoreceptor is desired. If the photoreceptor velocity and the illumination profile are constant in time, then all points on the photoreceptor will receive the same exposure. However, when the irradiance profile is modulated in time, the exposed image will also be modulated in a periodic pattern. This effect, which is called exposure strobing, can result in undesirable streaks on the output copy made when transferring a developed image from the photoreceptor surface. Strobing can be caused by various factors originating within the optical system. As one example, when the document illumination source is operated on line current, the lamp actually produces an illumination output which is flashing at the rate of 120 Hz. This results in a periodic variation in exposure on the photoreceptor surface in the direction of motion of the photoreceptor surface across the aperture. One method of compensating for this lamp strobing effect is to increase the frequency of the illumination lamps as taught in U.S. Pat. No. 3,998,539 assigned to the same assignee as the present invention. A second method is to place a transmission filter into the optical path, the filter having predetermined transmittance characteristics to provide a spatial irradiance profile having a zero Fourier transform at the required spatial frequency. This method is disclosed in U.S. Pat. No. 4,226,527 assigned to the same assignee as the present invention.

A second cause of exposure strobing can result from mechanical vibration of the various components comprising the optical system and, particularly, vibrations of the scan/illumination lamp as it accelerates during a scan mode. The natural frequency of the lamp sets up vibrations during scan acceleration. This vibration may produce a strobing effect at the photoreceptor if it has not damped out during prescan. It is therefore, an object of the present invention to provide a scan lamp assembly design which includes means for compensating for this lamp vibrational strobing effect.

Another problem associated with the use of illumination lamps in a document scanning system is the necessity of periodic replacement of the lamp. Lamp replacement requires an initial adjustment, usually performed by a field technician. It would be desirable to provide a support for a lamp which would permit a replacement lamp to be inserted into a fixed support at the precise location required for the scan illumination purposes described.

According to the invention, there is described an illumination lamp assembly for a scanning system which is designed to be field replaceable without adjustment and to be compensated for the effects of vibrational strobing. More particularly, the invention relates to a lamp assembly comprising in combination:

an elongated lamp, a pair of elliptical reflectors partially enclosing said lamp, said reflectors forming an elliptical surface therebetween, lamp end mounting means adapted to fixedly mount the respective ends of said lamp so that the radial center of the lamp is aligned along the foci of said elliptical surface, said mounting means including biasing means to releaseably engage said lamp ends securely.

Figure 1:
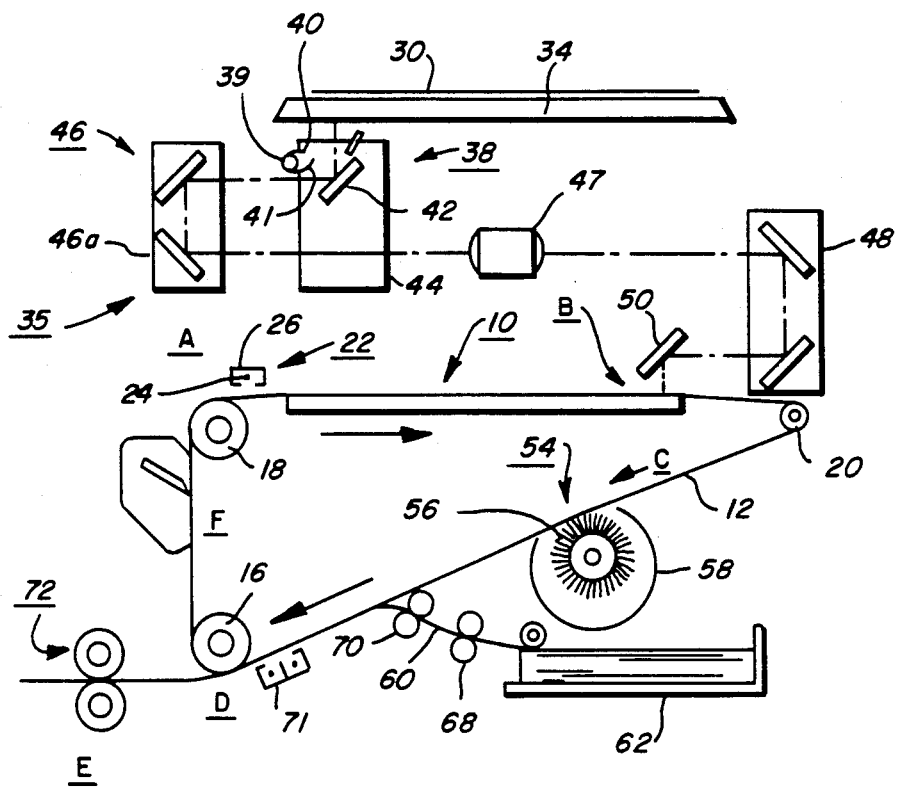
FIG. 1 is a side view of a document scanning system utilizing the illumination lamp assembly of the present invention.

For a general understanding of the features of the present invention, reference is made to the drawings. FIG. 1 schematically depicts the various components of an illustrative electrophotographic printing machine incorporating the illumination lamp assembly of the present invention therein. It will become apparent from the following discussion that this lamp assembly is equally well suited for use in a wide variety of electrophotographic printing machines and is not necessarily limited in its application to the particular embodiment shown herein.

Inasmuch as the art of electrophotographic printing is well known, the various processing stations employed in the FIG. 1 printing machine will be shown hereinafter schematically and their operation described briefly with reference thereto.

Turning now to FIG. 1, the electrophotographic printing machine uses a photoreceptor belt 10 having a photoconductive surface 12 formed on a conductive substrate. Belt 10 moves in the indicated direction, advancing sequentially through the various xerographic process stations. The belt is entrained about drive roller 18 and tension rollers 16, 20. Roller 18 is driven by conventional motor means, not shown.

With continued reference to FIG. 1, a portion of belt 10 passes through charging station A where a corona generating device, indicated generally by the reference numeral 22, charges photoconductive surface 12 to a relatively high, substantially uniform, negative potential. Device 22 comprises a charging electrode 24 and a conductive shield 26.

As belt 10 continues to advance, the charged portion of surface 12 moves into exposure station B. An original document 30 is positioned, on the surface of a transparent platen 34. Optics assembly 35 contains the optical components which incrementally scan-illuminate the document from left to right and project a reflected image onto surface 12 of belt 10 forming a latent image of the document thereon. Shown schematically, these optical components comprise an illumination lamp assembly 38, comprising an elongated tungsten illumination lamp 39 and associated elliptical reflectors 40 and 41. This assembly is described in further detail below. Full rate scan mirror 42, together with assembly 38, is mounted on a scan carriage 44. The carriage ends are adapted to ride along guide rails (not shown) so as to travel along a path parallel to and beneath, the platen. Lamp 39, in conjunction with reflectors 40, 41, illuminates an incremental line portion of document 30. The reflected image is reflected by scan mirror 42 to corner mirror assembly 46 mounted on a second scan carriage 46a. Scan carriage 46a is mechanically connected to carriage 44 and adapted to move at ½ the rate of carriage 44. The document image is projected through lens 47 and reflected by a second corner mirror assembly 48 and by belt mirror 50, both moving at a predetermined relationship so as to precess the projected image, while maintaining the required rear conjugate, onto surface 12 to form thereon an electrostatic latent image corresponding to the informational areas contained within original document 30.

At development station C, a magnetic brush development system, indicated generally by the reference numeral 54, advances an insulating development material into contact with the electrostatic latent image. Preferably, magnetic brush development system 54 includes a developer roller 56 within a housing 58. Roller 56 transports a brush of developer material comprising magnetic carrier granules and toner particles into contact with belt 10. Roller 56 is positioned so that the brush of developer material deforms belt 10 in an arc with the belt conforming, at least partially, to the configuration of the developer material. The thickness of the layer of developer material adhering to developer roller 56 is adjustable. The electrostatic latent image attracts the toner particles from the carrier granules forming a toner powder image on photoconductive surface 12.

Continuing with the system description, an output copy sheet 60 taken from a supply tray 62 is moved into contact with the toner powder image at transfer station D. The support material is conveyed to station D by a pair of feed rollers 68, 70. Transfer station D includes a corona generating device 71 which sprays ions onto the backside of sheet 60, thereby attracting the toner powder image from surface 12 to sheet 60. After transfer, the sheet advances to fusing station E where a fusing roller assembly 72 affixes the transferred powder image. After fusing, sheet 60 advances to an output tray (not shown) for subsequent removal by the operator.

After the sheet of support material is separated from belt 10, the residual toner particles and the toner particles of developed test patch areas are removed at cleaning station F.

Subsequent to cleaning, a discharge lamp, not shown, floods surface 12 with light to dissipate any residual charge remaining thereon prior to the charging thereof for the next imaging cycle.

A controller (not shown) incorporating a suitable microprocessor and memory, is provided for operating in predetermined timed relationships, the various components that comprise machine 10, including the document scan drive components to reproduce the document 30 onto copy sheet 60, as will be understood by those familiar with the art. A suitable controller is disclosed in co-pending application Ser. No. 798,369 whose contents are hereby incorporated by reference.

As shown in FIG. 1, carriage 44 moves, in a document scan mode, from left to right under control of the system controller, conveying lamp assembly 38 in a parallel scanning path beneath the platen. Each optical component of scan system 35 has a natural frequency. The preferred tungsten lamp embodiment is a commercial lamp 512 mm long, 6 mm in diameter and having a natural frequency range of 60-70 Hz. With a typical scanning speed of 17 ips and an initial acceleration of 2.5 gs, the lamp acquires a vibration component which causes the illumination profile at the photoreceptor surface 12 to oscillate in space. This oscillation results in exposure strobing causing undesirable streaking in the output copy sheet 60.

The natural frequency of lamp 39 is related to the spring rate and the mass of the lamp, expressed by the formula:

$$\text{natural frequency } (fn) = \frac{1}{2\pi} \sqrt{\frac{k}{m}} \tag{1}$$

where k is the spring rate in lbs/in and m is the mass of the object. Applicants perceived that if the spring rate (stiffness) of the lamp were increased, the natural frequency would be increased. The frequency response of the mechanical system could then be tailored to a higher natural frequency which will damp out sooner. Applicants' solution, according to a first embodiment of the invention, is to install an elastomeric O-ring 80, shown in FIGS. 2 and 3, around the lamp circumference. The O-ring is biased against the lamp surface by designing reflectors 40 and 41 so that they are joined together at interface seam 82, securing O-ring 80 between the reflectors and the lamp surface. The O-ring is positioned between lamp filaments 84 so as not to interfere with light transmission. By positioning the O-ring in the center (length) the lamp length is effectively cut in half, thus increasing the stiffness by a factor of 8. For some systems it may be desirable to use more than one O-ring. An alternate solution, still associated with the increased lamp stiffness concept is to fasten one or more extension springs around the lamp in a garter fashion. Again, the springs would be arranged so as not to block light transmission from the filaments.

Figure 2:
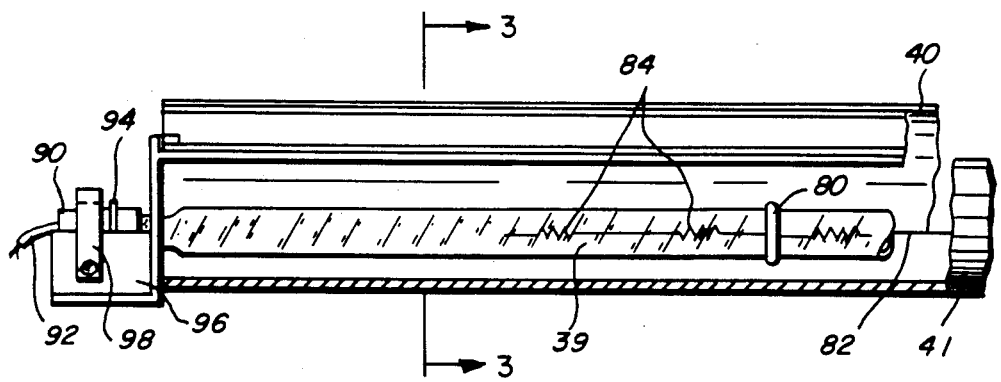
FIG. 2 is a front view of the lamp assembly of the present invention.
Figure 3:
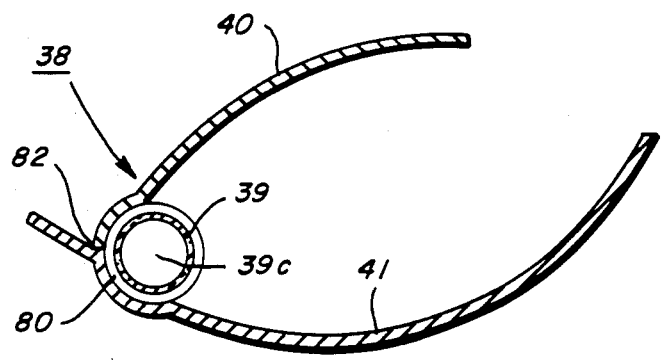
FIG. 3 is a cross-sectional side view of the lamp assembly mounting.
Figure 4:
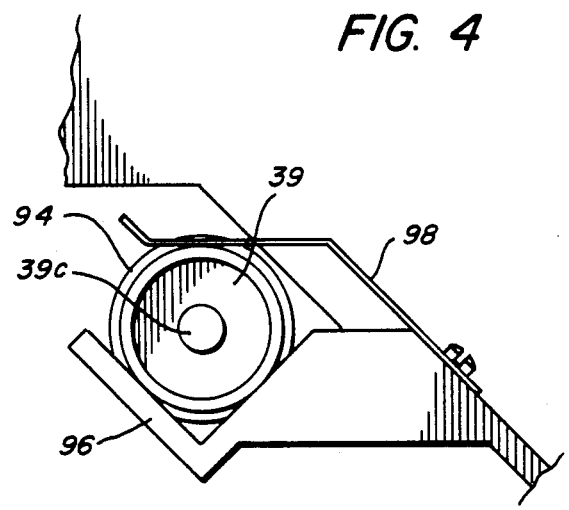
FIG. 4 is an end view of the lamp assembly mounting taken along view 3—3 of FIG. 2.

According to a second aspect of the invention, lamp assembly 38 is designed to permit replacement without the necessity for any adjustment. The prime requirement when replacing a lamp having associated elliptically-shaped reflectors, is to ensure that the lamp is located with its center 39c coincident with the foci of the elliptical surface. As shown in FIGS. 2 and 3, lamp 39 has its center lying on the foci of reflectors 40, 41. Each end of lamp 39, as shown in FIG. 2, has a ceramic end cap 90 and contains an electrical lead wire 92 extending through the end cap. The end cap has a circular ridge 94 which defines an end seating surface extending from the left edge to the ridge. End cap 90 is seated in V-block 96, shown in FIGS. 2 and 4 which is incorporated in the ends of the lamp carriage assembly. These V-blocks are designed so that the lamp ends, when seated in the V-block and held in place by leaf springs 98, locate the lamp center in the desired focal position, e.g. at the foci of the two reflectors. In order to replace a lamp, the upper reflector 40 is removed and the lamp is removed by disconnecting lead wires 92, lifting leaf springs 98 upward sufficient to release the end caps 90 from contact with the V-block 96 and lifting the lamp away. A new lamp is then secured by engaging the end cap 90 into the mating (recessed) position of the V-block and biasing the end cap into position with the leaf spring 98. The lead wires can then be reconnected.

It is believed that the foregoing description is sufficient for purposes of the present application to illustrate the general operation of an electrophotographic printing machine incorporating the main feature of the present invention therein, e.g. a scan lamp assembly replaceable wthout adjustment and compensated for the effects of mechanical strobing.

While the invention has been described with reference to the structure disclosed, it is not confined to the details set forth, but is intended to cover such modifications or changes as may come within the scope of the following claims.

What is claimed is:

1. A lamp assembly comprising, in combination:
    an elongated lamp,
    a pair of elliptical reflectors partially enclosing said lamp and joined to each other along a common interface, and
    at least one flexible member encircling the lamp envelope along at least one point of its circumference, said flexible member being secured at said interface and held in biased contact with said lamp envelope.

2. The lamp assembly of claim 1 wherein said flexible member is an elastomeric O-ring.

3. In an electrophotographic document reproduction system wherein a document on an object plane is scan-/illuminated by a scanning optical system to project an image of the document onto a photosensitive recording member, a document illumination assembly compensated for strobing effects at the recording member caused by mechanical vibrations during scan, the illumination assembly comprising, in combination:
    an elongated lamp, a pair of elliptical reflectors partially enclosing said lamp and joined to each other along a common interface, and at least one flexible member encircling the lamp envelope along at least one point of its circumference, said flexible member being secured at said interface and held in biased contact with said lamp envelope.

4. In an electrophotographic document reproduction system wherein a document on an object plane is scan-/illuminated by a scanning optical system to project an image of the document onto a photosensitive recording member, a document illumination assembly compensated for strobing effects at the recording member caused by mechanical vibrations during scan, the illumination assembly comprising, in combination:
    an elongated lamp, a pair of elliptical reflectors partially enclosing said lamp and joined to each other along a common interface, and a means for increasing the natural frequency of the lamp, said means consisting of at least one flexible member encircling the lamp envelope along at least one point of its circumference, saif flexible member being secured at said interface and held in biased contact with said lamp envelope.

* * * * *